(12) United States Patent
Delannes et al.

(10) Patent No.: US 10,302,212 B2
(45) Date of Patent: May 28, 2019

(54) SERVOMOTOR FOR INDUSTRIAL VALVE OR LEAF WITH CONNECTING CARD AND CONNECTOR

(71) Applicant: BERNARD CONTROLS, Gonesse (FR)

(72) Inventors: Alexis Delannes, Nogent sur Marne (FR); Jaafar Medarhri, Le Bourget (FR)

(73) Assignee: BERNARD CONTROLS, Gonesse (FR)

( * ) Notice: Subject to any disclaimer, the term of this patent is extended or adjusted under 35 U.S.C. 154(b) by 0 days.

(21) Appl. No.: 15/849,917

(22) Filed: Dec. 21, 2017

(65) Prior Publication Data

US 2019/0120400 A1    Apr. 25, 2019

(30) Foreign Application Priority Data

Oct. 20, 2017  (FR) ..................... 17 59948

(51) Int. Cl.
*F16K 31/04* (2006.01)
*H01R 13/52* (2006.01)

(52) U.S. Cl.
CPC .......... *F16K 31/046* (2013.01); *F16K 31/047* (2013.01); *H01R 13/521* (2013.01); *H01R 13/5208* (2013.01)

(58) Field of Classification Search
CPC ... F16K 31/046; F16K 31/047; H01R 13/521; H01R 13/5213; H01R 13/5219; H01R 13/5221; H01R 13/5208; Y10T 137/87885

USPC .............. 251/129.04, 129.11–129.13, 249.5; 137/884

See application file for complete search history.

(56) References Cited

U.S. PATENT DOCUMENTS

| | | | | |
|---|---|---|---|---|
| 3,456,232 A | * | 7/1969 | Dupre ................ | H01R 13/5219 174/77 R |
| 5,062,611 A | * | 11/1991 | Hatton ............... | B60H 1/00485 251/129.11 |
| 5,181,540 A | * | 1/1993 | Campau ................. | B63B 35/26 251/129.11 |

(Continued)

OTHER PUBLICATIONS

French Republic National Institute of Industrial Property; Preliminary Research Report of National Registration No. FR 17 59 948, dated Jun. 20, 2018.

*Primary Examiner* — John Bastianelli
(74) *Attorney, Agent, or Firm* — Cantor Colburn LLP

(57) ABSTRACT

A servomotor for an industrial valve includes a coupling to an industrial valve shaft, receives electrical power and an external command, and includes an electric motor, a kinematic chain connected to the motor to act on the valve, and a local command unit for commanding the motor and the kinematic chain in response to the external command. A protective housing of the local command unit and a connecting card close an open face of the housing. Metal lugs defining individual electrical contacts protrude from an inner side of the card, opposite from the open face. The servomotor includes an elastomeric material extending parallel to the connecting card and which is pierced for passage of the lugs, and positioned to ensure tightness between the connecting card and the housing at the open face of the housing. The invention also relates to an assembly for implementing a servomotor with a connector.

10 Claims, 7 Drawing Sheets

(56) References Cited

U.S. PATENT DOCUMENTS

| | | | |
|---|---|---|---|
| 5,234,033 A * | 8/1993 | Stoll | F15B 13/0814 |
| | | | 137/884 |
| 5,941,282 A * | 8/1999 | Suzuki | B60R 16/0239 |
| | | | 137/884 |
| 5,957,547 A * | 9/1999 | Schliebe | B60T 8/368 |
| | | | 303/119.3 |
| 6,435,169 B1 * | 8/2002 | Vogt | F02D 21/08 |
| | | | 251/129.11 |
| 7,201,585 B2 * | 4/2007 | Pirner | B60T 8/3675 |
| | | | 439/76.1 |
| 2011/0121764 A1 | 5/2011 | Bernard et al. | |
| 2014/0125161 A1 | 5/2014 | Cloran et al. | |
| 2017/0133906 A1 | 5/2017 | Pfeiffer et al. | |

* cited by examiner

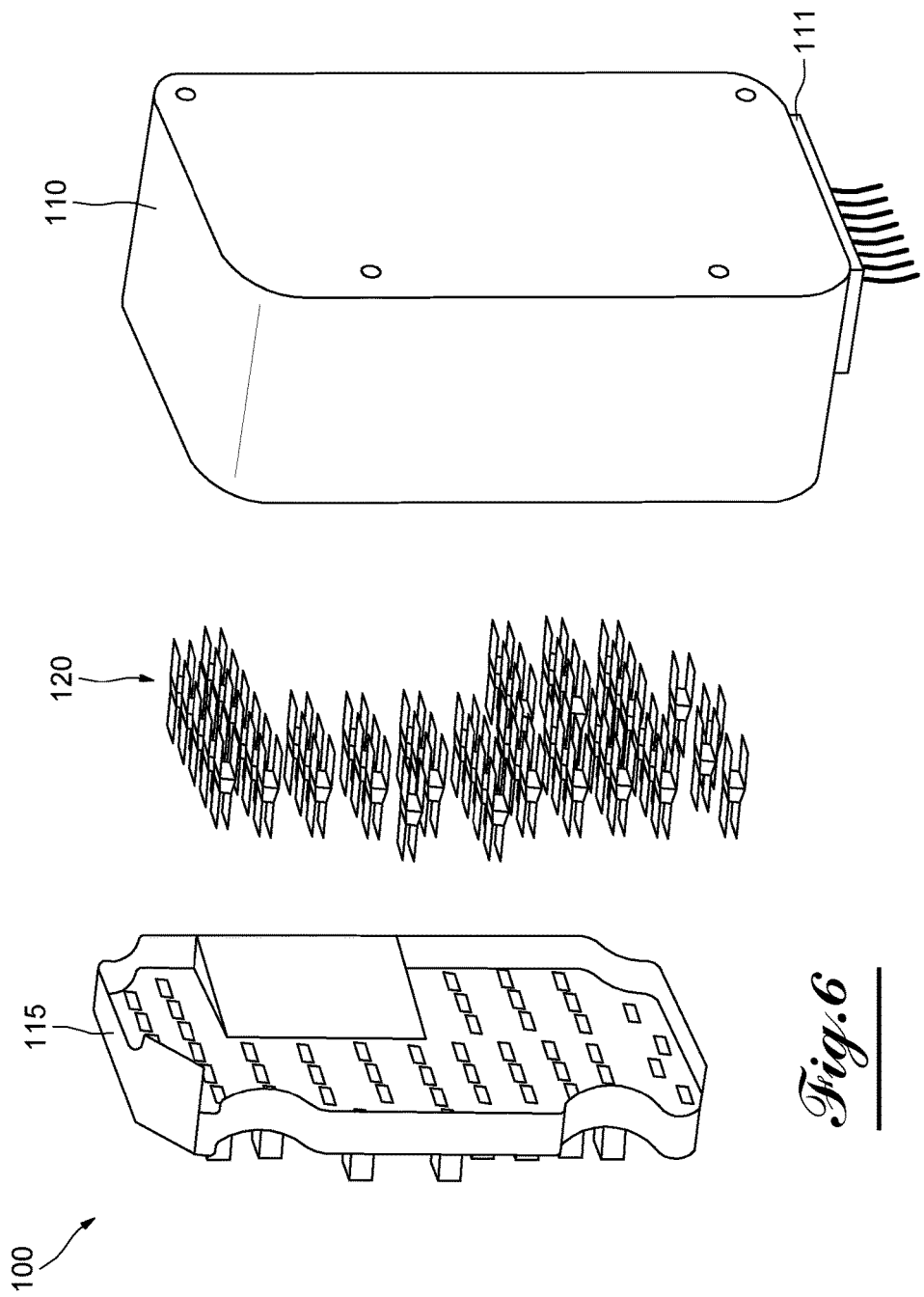

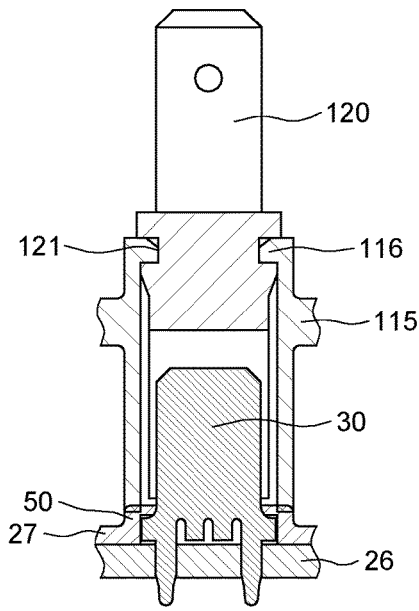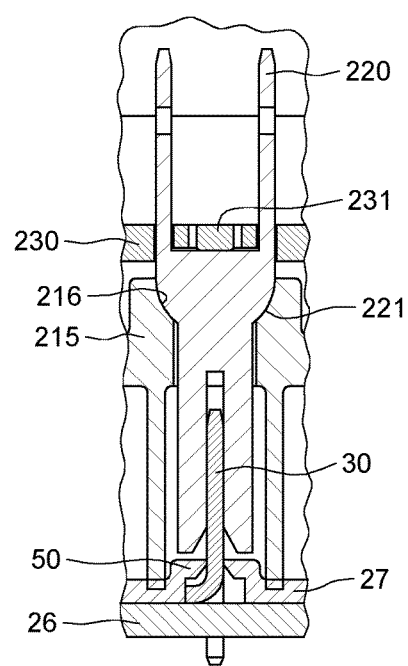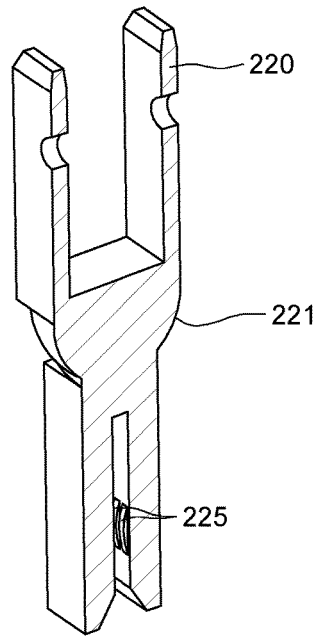

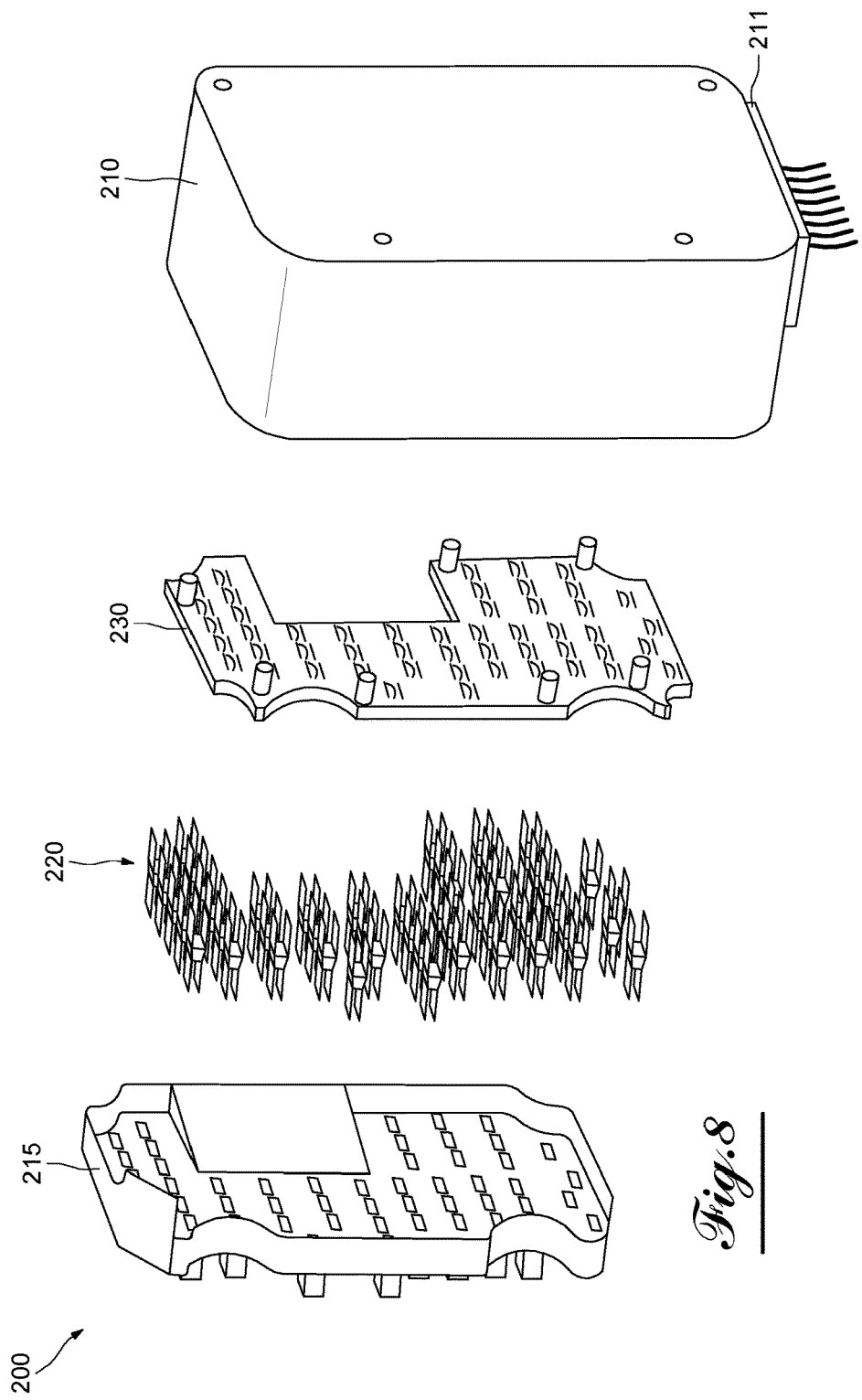

SERVOMOTOR FOR INDUSTRIAL VALVE OR LEAF WITH CONNECTING CARD AND CONNECTOR

FIELD OF THE INVENTION

The invention relates to an electric servomotor for members for regulating fluid circuits in an industrial setting, such as industrial valves or leaves, and an assembly for implementing a servomotor with a connector.

BACKGROUND OF THE INVENTION

Servomotors for industrial valves are electromechanical systems acting on the valve of an industrial fluid circuit so as, depending on the pressure encountered in the valve, to act to close it, open it or keep it in its current state.

Servomotors are suitable for different types of valves, and may therefore be quarter-revolution or multi-revolution servomotors. They are often used under demanding environmental conditions, and must therefore often be tight, impermeable to dust, and able to withstand cold or heat. Indeed, servomotors for industrial valves are found in harsh environments such as refineries, nuclear power plants, or treatment plants.

Electric servomotors comprise an electric motor and a kinematic chain for transmitting power from the motor to an actuating element of the valve, by suitably downshifting the torque supplied by the motor.

They also have sensors for monitoring the state of the valve and a local control unit for controlling the motor and the kinematic chain. The latter may receive commands from a command unit outside the servomotor placed elsewhere in the industrial installation, and able to be tasked with commanding several servomotors placed on different valves of the installation.

To send these commands, as well as the electrical power necessary for the operation of the motor, as well as, in the reverse direction, the signals coming from the internal sensors, an electrical connection with multiple contacts, independent of one another, is present on a wall of one of the enclosures of the servomotor. Traditionally, each time the servomotor is disassembled, then reassembled on a given valve, the electrical connection with multiple contacts should be disassembled, which involves many screwing and unscrewing operations of screws on eye wires. This is time-consuming and tedious, and sometimes a source of errors. The tightness is in particular ensured using cable glands, which must be tightened.

SUMMARY OF THE INVENTION

There is consequently a desire to establish alternative solutions, with equipment that is easier to use, and preferably not as heavy.

To that end, a servomotor is proposed for an industrial valve comprising means for coupling to an industrial valve shaft, means for receiving electrical power and an outside command, and in the reverse direction, sending signals, and an electric motor and a kinematic chain connected to one another to apply an action on said valve, as well as a local command unit to command the motor and the kinematic chain under the control of the external command.

The servomotor is remarkable in that said means for receiving electrical power and an external command comprise a protective housing of the local command unit and a connecting card closing off an open-worked face of the housing, as well as metal lugs defining individual electrical contacts protruding from the card on the other side of the housing for manual connection without tools or screws, the connecting card being placed to close off the open-worked face on the inner side thereof, and the servomotor additionally comprises a piece made from an elastomeric material extending parallel to the connecting card on its outer face, pierced to allow the lugs to pass while ensuring tightness around the latter, and positioned also to ensure the tightness between the connecting card and the inner contour of the open-worked face of the housing.

The invention also consists of an assembly for implementing a servomotor with a connector comprising a servomotor for an industrial valve as mentioned above, additionally comprising a removable connector comprising a housing and contactors complementary with respect to said lugs positioned on a face of the housing to connect or disconnect said lugs simultaneously.

According to optional and advantageous features:
  the piece made from elastomeric material comprises lips
    over its entire circumference, it is assembled with the
    inner contour of the open-worked face of the housing
    by gripping, and the lips are deformed during gripping
    to ensure tightness;
  the piece made from elastomeric material is made from
    EPDM rubber;
  the connecting card is connected to the local command
    unit on its inner face with reduced cabling relative to
    what was done with the prior art;
  the connecting card comprises a printed circuit, as well as
    a rigid plastic piece assembled to the printed circuit on
    its face opposite the piece made from elastomeric
    material, to ensure maintenance of the connecting card,
    and to impart rigidity to it, and thus to facilitate the
    insertion of complementary lugs on said metal lugs;
  in one embodiment, the complementary contactors are
    forks inserted by force into a wall of the housing;
  in another embodiment, the complementary contactors
    kept floating between two pieces forming a wall of
    the housing;
  advantageously, the complementary contactors comprise a contact element pre-stressed to favor the
    electrical contact.

The servomotor may in particular be a multi-revolution or quarter-revolution servomotor. The kinematic chain may for example comprise or be made up of a worm screw and an epicyclic gear train.

BRIEF DESCRIPTION OF DRAWING FIGURES

The invention will be better understood, and other aims, features, details and advantages thereof will appear more clearly, during the following explanatory description done in reference to the appended drawings, provided solely as an example illustrating one embodiment of the invention and in which:

FIG. 6 is an exploded view of the first embodiment of the second aspect of the invention;

FIG. 7 is a detail view of this first embodiment;

FIG. 8 is an exploded view of a second embodiment of the second aspect of the invention;

FIG. 9 is a detail view of this second embodiment; and

FIG. 10 is a view of an embodiment detail of the second embodiment.

DETAILED DESCRIPTION

Figure 1:
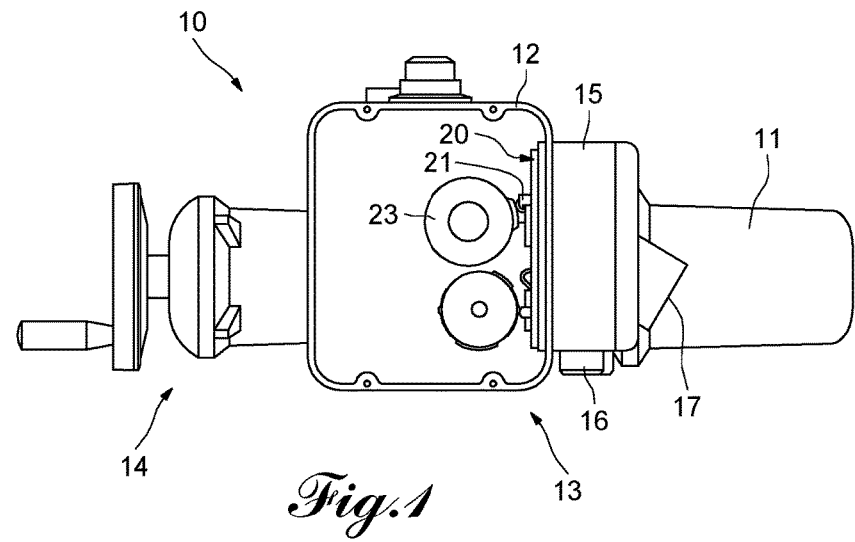
FIG. 1 is a view of a servomotor according to the invention.

In FIG. 1, a servomotor 10 is shown comprising an electric motor 11 and a protective enclosure, an electrical housing 12 for accommodating the control and command functions of the servomotor, coupling means 13 (in the rear in the figure) to a valve, a manual command in the form of a hand wheel 14, a client interface housing 15, an outlet for the cables 16 or 17 on the client interface housing 15 or its lid. The servomotor may comprise a man-machine interface with a liquid crystal display screen and pushbuttons (not shown).

One of the faces of the electrical housing 12 is open-worked, but closed off by an electrical connection plate 20. The latter has a face turned toward the outside of the housing 12, and a face turned toward the inside thereof. The client interface housing 15 is fastened to the electrical housing 12 on its closed off face around the electrical connection plate 20, by four screws (not shown).

Inside the electrical housing 12, shown here in a version of the servomotor without electronics, cams 23 interact with switches 21 placed on the inner face of the electrical connection plate 20. The electrical connection plate 20 allows an electrical connection without cabling of the inside of the servomotor, at least for certain functions, like the connections connected to switches. Cabling is present for transmitting power and any options, such as the potentiometer for copying the position of the valve. It is specified, non-limitingly, that the invention may also be used with a version of the servomotor with electronics, in which external commands are sent by the user to the on board electronics of the servomotor, the latter being tasked, inter alia, with starting up the motor and defining its rotation direction.

The kinematic chain of the servomotor comprises a worm screw and an epicyclic gear train (not shown). These elements, as well as the electric motor, are controlled by the command unit positioned in the electrical housing 12, which receives the electrical power and the command signals by the electrical connection plate 20.

Sensors (not shown) measure the behavior of the valve and the motor, and the information that they collect is sent by the electrical connection plate 20 and the connection housing 15 to an outside command unit (not shown), which sends the command signal in return.

Figure 2:
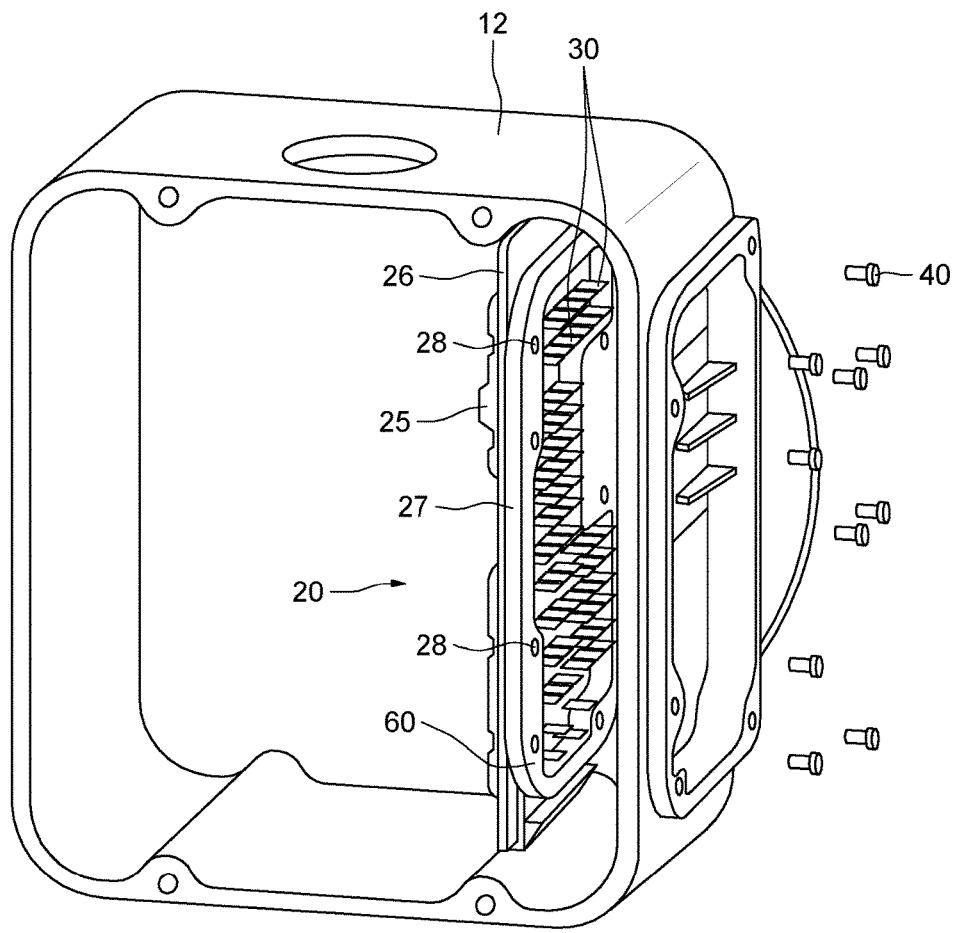
FIG. 2 is a view of the electrical housing of the servomotor of FIG. 1.

The electrical housing 12 is shown in FIG. 2, in exploded view, the electrical connection plate 20 being positioned before being screwed using approximately ten screws inserted from the outside of the electrical housing 12. These screws are referenced 40 and are inserted into holes of the housing 12, then into tapped holes 28 of the electrical connection plate 20.

The electrical connection plate 20 is made up of the assembly of a plastic holding plate 25 on the inner side of the housing, a connecting card 26 in the form of a printed circuit, and an elastomeri c membrane 27 placed against the connecting card 26 on its face oriented toward the outside of the electrical housing 12. These three plates, which are globally rectangular, are placed against one another, their respective large sides parallel to one another and in the indicated order, so as to make up the electrical connection plate 20, which is also globally rectangular, with a size adapted to closing off the open face of the electrical housing 12. Individual electrical connecting wires 30 protrude from the elastomeric membrane 27 on the outer side of the electrical housing 12.

Figure 3:
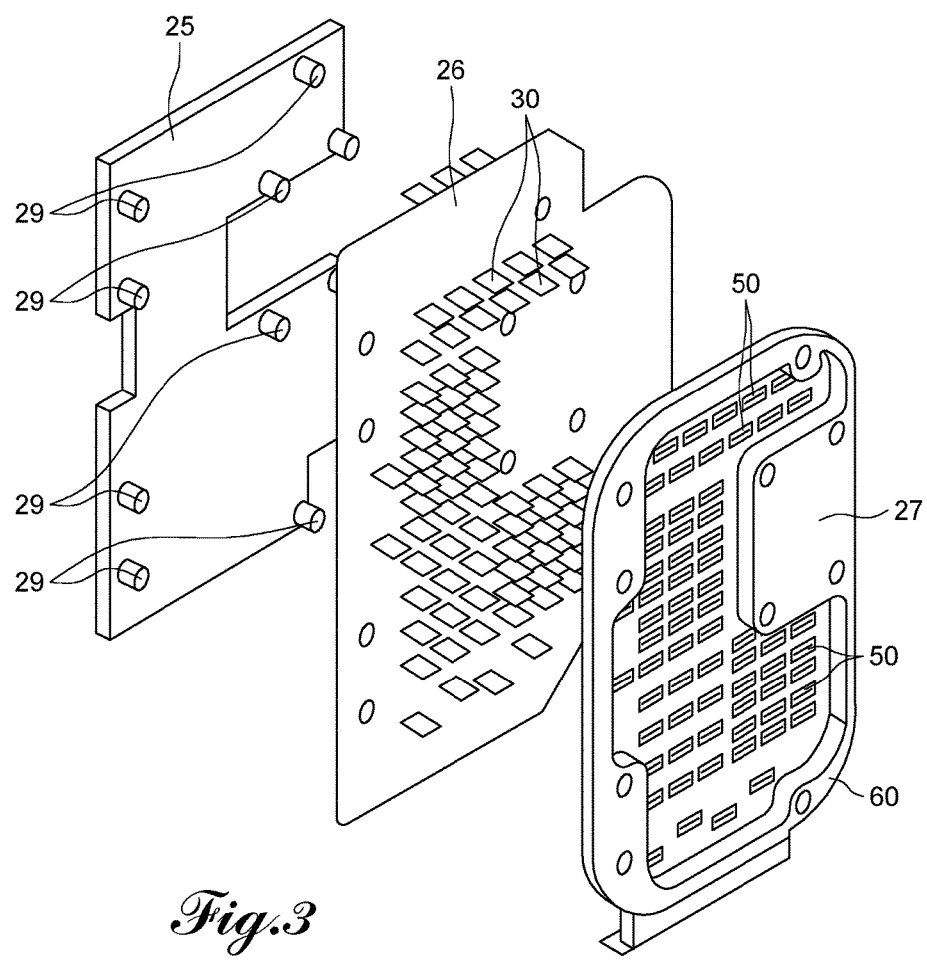
FIG. 3 is an exploded view of an aspect of the invention corresponding to the views of FIGS. 1 and 2.

The electrical connection plate 20 is shown in more detail in FIG. 3, in exploded view. The individual electrical connection lugs 30 are welded directly on the connecting card 26, which has conductive metal tracks such as copper for connecting the various internal components of the electrical housing 12. On its outer face, the lugs 30 are intended to be subject to a removable connection by the user, based on the configuration needs of the servomotor. There can be 51 of them. On the inner face of the electrical connection plate 20, connecting lugs are also present, on the switch side, for the electrical connection and the interaction with the internal components of the electrical housing.

The elastomeric membrane 27 includes through slits 50, positioned and sized to allow the connecting lugs 30 to pass, and each surrounded by a lip formed in the elastomeric material for tightness.

The elastomeric material can be EPDM (ethylene-propylene-diene monomer) rubber.

The border 60 of the elastomeric membrane 27 also includes a lip for tightness. This lip is crushed during gripping of the electrical connection plate 20 against the inner face of the circumference of the opening of the open-worked face of the electrical housing 12. Ultimately, through its design, the electrical connection plate 20 constitutes a sealing barrier between the outside and inside of the electrical housing 12.

Figure 4:
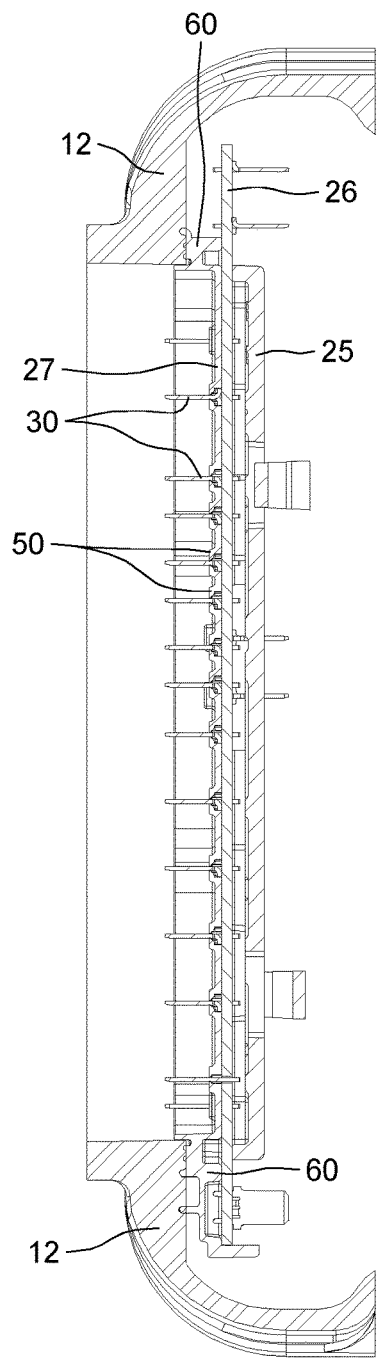
FIG. 4 is a sectional view of the same aspect of the invention.

The plastic holding plate 25 includes raised tapped holes 29 for forming, with corresponding openings of the elastomeric membrane 27 and the connecting card 26, the holes 28 shown in FIG. 2 and receiving the screws 40 also shown in FIG. 2, for fastening the three parts of the connecting card 26 together and pressing them and holding them against the inside of the open-worked face of the housing 12. FIG. 4 shows the border 60 bearing the lips crushed against the electrical housing 12. One can also see the lugs 30 traverse the lips 50 of the elastomeric membrane 27.

It is easy for a user of the servomotor to plug the complementary female lug parts on the lugs 30. The connectors are placed one by one, by hand.

The lugs used are for example Faston lugs (AMP TE company brand).

Figure 5:
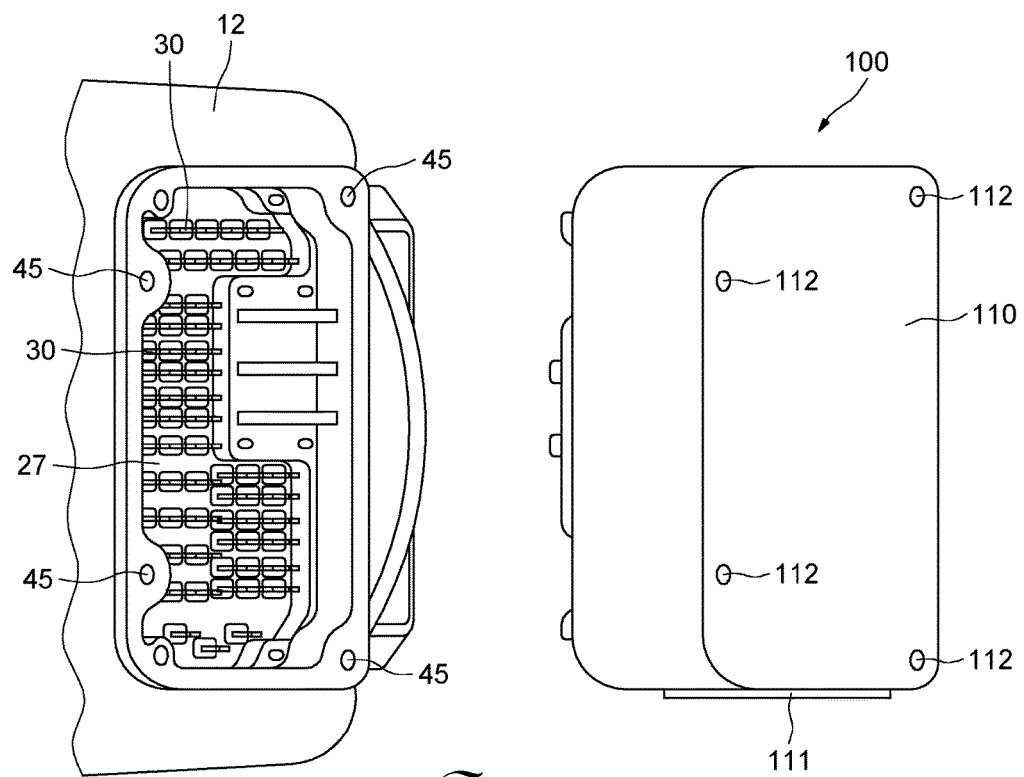
FIG. 5 is a three-quarters view of a second aspect of the invention.

FIG. 5 shows the electrical connection plate 20, only the elastomeric membrane 27 and the lugs 30 of which are visible. The electrical connection plate 20 has been screwed inside the electrical housing 12. A multiple connector 100 is brought closer and is used to connect all of the lugs 30 at the same time. The multiple connector 100 is designed in the form of a rectangular parallelepiped housing 110 with an output 111 for the cables. It is screwed to the housing 12 by screws that are inserted into the holes 112 of the multiple connector 100 and engaged in the tapped holes 45 of the housing 12, adapted to the diameter of the screws to constitute a fastening system with them.

A first embodiment of the multiple connector 100 is shown in FIG. 6. It comprises a substrate 115 made from a plastic polymer material in which individual connectors 120 are mounted forcibly, by clipping, allowing travel parallel to the lugs 30 of the servomotor once the connectors are in place. The individual connectors 120 are cabled individually to the inside of the connector 100 so as to bring the electrical power and the various command and monitoring signals of the servomotor to and from the output 111 for the cables.

FIG. 7 shows the mounting of an individual connector 120 in the substrate 115, which, after the forcible insertion, is maintained by the insertion of a rib 116 in a slot 121 of the individual connector 120. On either side of the slot 121, the individual connector 120 is made up of two forks. The fork that faces the lug 30 is gripped and adjusted for electrical contact with the lug 30 with good reliability. The fork that is opposite the lug 30 is suitable for being electrically connected in one manner or another, in particular, for example with female Faston lugs.

A pre-stressed multi-blade present in the fork that faces the lug 30 makes it possible to reliabilize the electrical contact. Such a multi-blade is visible in FIG. 10 in the context of the second embodiment.

FIG. 8 shows an alternative of the multiple connector described above. This other multiple connector is referenced 200 and is designed in the form of a rectangular parallelepiped housing 210 with an outlet 211 for the cables.

The multiple connector 200 comprises a substrate 215 made from a plastic polymeric material in which individual connectors 220 are mounted interposed between the substrate 215 and an interposition piece made from a plastic polymeric material 230. The individual connectors 220 are cabled individually to the inside of the connector 200 so as to bring the electrical power and the various command and monitoring signals of the servomotor to and from the output 211 for the cables.

FIG. 9 shows the mounting of an individual connector 220 between the substrate 215 and the interposition piece 230. The individual connector 220 has a spherical shape 221, the substrate has a complementary spherical shape 216, and the interposition piece 230 has through apertures 231, which make it possible to define degrees of freedom for the individual connector 220 during its engagement with the corresponding lug 30.

On either side of the spherical shape 221, the individual connector 220 is made up of two forks. The fork that faces the lug 30 is gripped and adjusted for electrical contact with the lug 30 with good reliability. A pre-stressed multi-blade 225 present in the fork that faces the lug 30 makes it possible to reliabilize the electrical contact. This multi-blade is visible in FIG. 10. The fork that is opposite the lug 30 is electrically connected in one manner or another, in particular, for example with female Faston lugs.

The invention claimed is:

1. A servomotor assembly having a connector, the servomotor assembly comprising:
   an electric motor;
   coupling means coupling the electric motor to a valve shaft;
   means for receiving electrical power and an external command comprising
      an electrical housing having a closed face and an open face,
      a connection plate closing the open face from inside the electrical housing and including
         a connecting card having
            a first side facing outwardly from the electrical housing and a second side facing inwardly into the electrical housing, and
            metal lugs providing respective electrical contacts for manual connection of at least one electrical contactor and protruding outwardly from the electrical housing, and
         an elastomeric membrane extending parallel to the connecting card including piercings through which the metal lugs pass and ensuring a tight fit to the metal lugs and of the connection plate to the electrical housing at the open face;
   a kinematic chain connected to the electric motor to apply an action to the valve shaft;
   a local command unit located within the electrical housing for commanding the motor and the kinematic chain in response to the external command; and
   a removable connector comprising a connector housing and complementary contactors, located in positions complementary to positions of the metal lugs of the electrical housing.

2. The servomotor assembly according to claim 1, wherein the elastomeric membrane has a periphery and comprises a lip along the periphery that is deformed between the connecting card and the closed face of the electrical housing adjacent the open face of the electrical housing.

3. The servomotor assembly according to claim 1, wherein the elastomeric membrane is EPDM rubber.

4. The servomotor assembly according to claim 1, wherein the connection plate is connected without cabling to the local command unit.

5. The servomotor assembly according to claim 1, further including complementary contactors, wherein
   the connecting card comprises a printed circuit, and
   the connection plate comprises a rigid plastic holding plate and the connecting card is between the rigid plastic holding plate and the elastomeric membrane for insertion of the complementary contactors onto the metal lugs.

6. The servomotor assembly according to claim 5, wherein the complementary contactors have the configuration of forks.

7. The servomotor assembly according to claim 5, wherein the complementary contactors are a pair of forks which are disposed between two pieces of a wall of the electrical housing.

8. The servomotor assembly according to claim 5, wherein the complementary contactors comprise a pre-stressed contact element urging electrical contact between the metal lugs and the complementary contactors.

9. The servomotor assembly according to claim 1, wherein the servomotor is a multi-revolution or a quarter-revolution servomotor.

10. The servomotor assembly according to claim 1, wherein the kinematic chain comprises a worm screw and an epicyclic gear train.

* * * * *